(No Model.) 2 Sheets—Sheet 1.
L. R. BONEHILL.
FURNACE FOR SMELTING AND REFINING ORES.
No. 518,874. Patented Apr. 24, 1894.
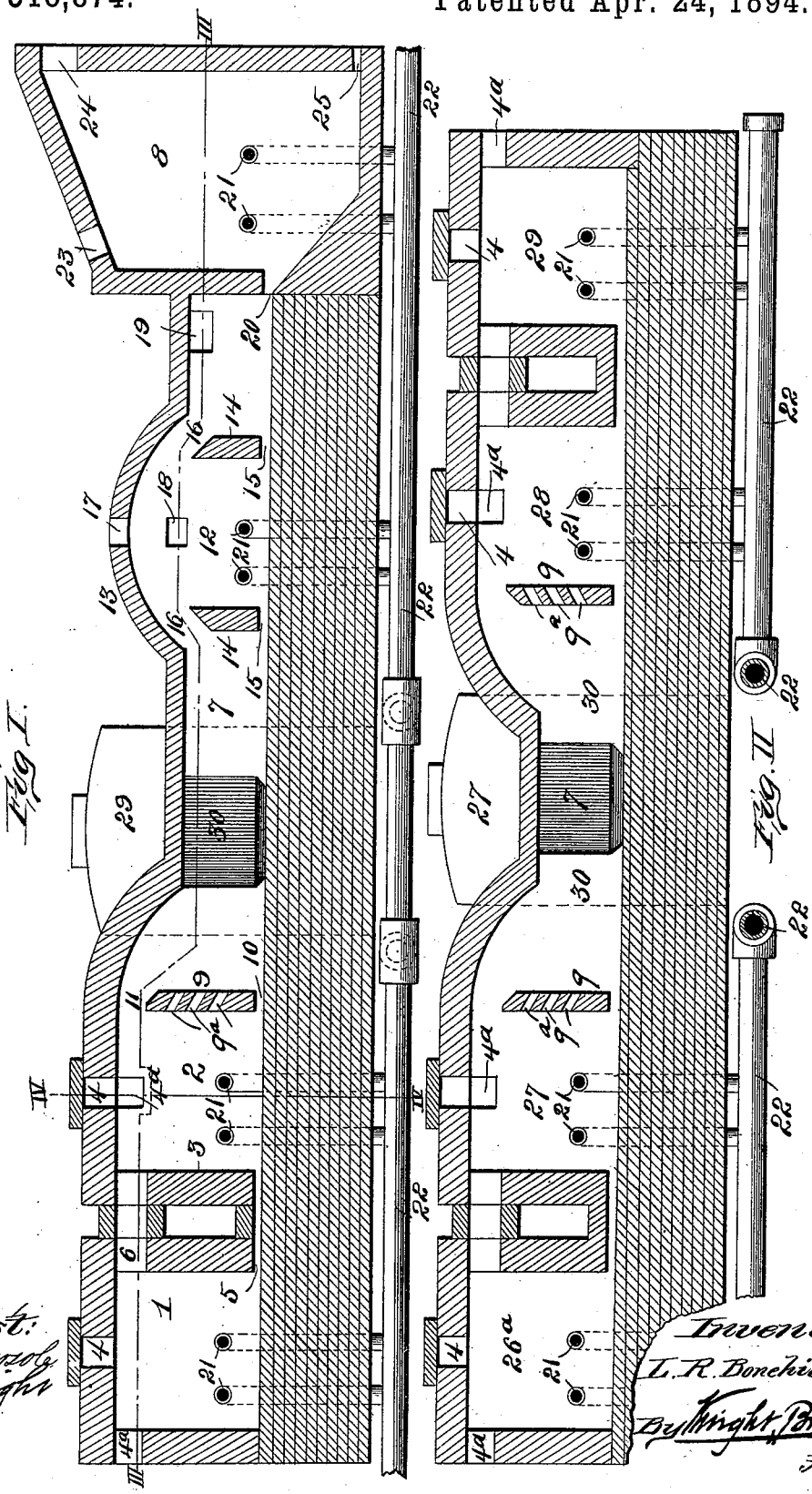

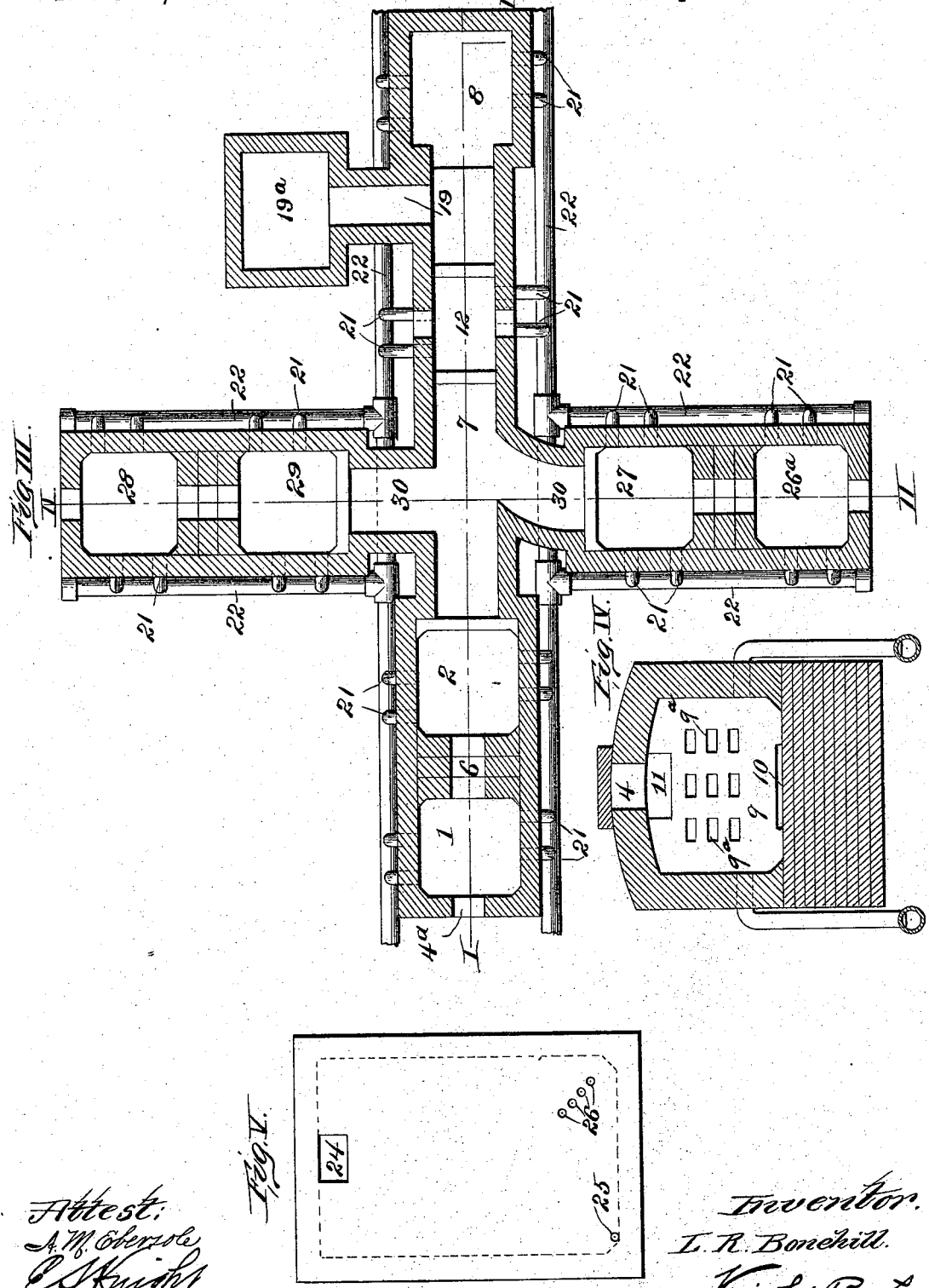

UNITED STATES PATENT OFFICE.

LOUIS ROBERT BONEHILL, OF ST. LOUIS, MISSOURI, ASSIGNOR TO WILLIAM H. SWIFT, OF SAME PLACE.

FURNACE FOR SMELTING AND REFINING ORES.

SPECIFICATION forming part of Letters Patent No. 518,874, dated April 24, 1894.

Application filed October 16, 1893. Serial No. 488,281. (No model.)

*To all whom it may concern:*

Be it known that I, LOUIS ROBERT BONEHILL, of the city of St. Louis, in the State of Missouri, have invented a certain new and useful Improvement in Furnaces for Smelting and Refining Ores, of which the following is a full, clear, and exact description, reference being had to the accompanying drawings, forming part of this specification.

My present invention relates to an improved furnace, well adapted for treating copper and other ores, to produce a refined product with a minimum amount of labor in handling the furnace during the process of smelting and refining.

My invention consists in features of novelty hereinafter fully described and pointed out in the claims.

Figure I is a vertical, longitudinal section of my improved furnace, taken on line I—I, Fig. III. Fig. II is a transverse section, taken on line II—II, Fig. III. Fig. III is a horizontal, longitudinal section, taken on line III—III, Fig. I, but is made to a smaller scale. Fig. IV is a vertical, transverse section, taken on line IV—IV, Fig. I, and looking toward the rear of the furnace. Fig. V is an elevation of the rear end of the main part of the furnace, with the side wings not appearing.

Referring to the drawings, 1, 2, represent the two chambers of a double smelting furnace, divided by a partition 3, and into which the charcoal or coke, and the mineral ore are placed through openings 4, and observed and worked through openings $4^a$. There is a space 5 beneath the partition 3 for the molten mass to pass from the chamber 1 into the chamber 2 of the double furnace, and there is an opening 6 above the partition for the gases to pass from the chamber 1 to the chamber 2. From the furnace 1, 2, there extends a conduit 7 to a purifying chamber 8, the floor of the conduit being inclined downwardly from the furnace to the purifier, as shown in Fig. I. Between the chamber 2 and the conduit is a partition 9, beneath which is a passage 10 for the molten metal, and above which is a passage 11 for the gases. In the conduit 7, near the purifier, is a fire chamber 12, which I term an "epurator," and which acts to purify the metal on its passage to the purifying chamber 8 and to largely consume the gases which enter the chamber with the metal. The epurator is formed by a dome 13 in the top of the conduit, and by partitions 14 in the conduit, there being spaces 15 beneath the partitions for the passage of the metal, and spaces 16 above the partitions for the passage of the gases. The epurator is charged with coke or charcoal through an opening 17, and the fuel may be leveled off in the epurator by a tool inserted through an opening 18.

19 is a flue at the purifier end of the conduit, which leads to a chimney, $19^a$. The molten metal and slag pass through the conduit into the purifier 8, through a gate or passage 20, while the gases, after being subjected to the heat, as they traverse the conduit, and the intensely heated epurator, escape through the flue 19 to the chimney.

21 represents branch air pipes leading from the air pipe 22, for supplying air to the furnace epurator and purifier. The purifier which is designed to give the molten metal a final heating and purifying before being drawn off, is charged with fuel, (coke or charcoal,) introduced through an opening 23, and leveled off and examined through an opening 24. In the lower part of the outer wall of the purifier is an opening 25, (see Figs. I and V,) through which the pure metal is drawn, after being subjected to the heat in the purifier, in addition to the heat to which it is subjected in the furnaces, and while passing through the conduit 7, and epurator 12. The end of the purifier has also a number of openings 26, (see Fig. V,) through which the slag or impurities are drawn from the purifier. It will be understood that the opening 25 will be kept plugged up until it is desired to draw the metal, and the openings 26 are left open, to permit the flow of the impurities, and should the metal rise to the lower opening 26 before it is desired to draw it from the furnace, this lower opening would be plugged, and the impurities would flow from the next opening above, and this next opening would be plugged, should the metal rise to it, and so on.

The partitions 9 are preferably provided with a number of openings 9ª, in addition to the opening 11, for the passage of the heat and gases.

26ª, 27 and 28, 29 represent lateral furnaces, communicating with the conduit 7 through passages 30, (see Figs. II and III,) the construction of these furnaces being the same as the construction of the furnaces 1, 2; all of the furnaces being provided with the openings 4, through which the metal and fuel are introduced, and with openings 4ª through which the contents may be worked and observed.

With a furnace of my improved construction, hand work is needed only for charging the furnaces, and for collecting the metal at the purifier, and the intense heat to which the metal and gases are subjected in the furnaces and in the epurator and purifier, results in the production of a highly refined product.

I claim as my invention—

1. The combination in a furnace, having a fire chamber, an epurator, and a purifier; the purifier being formed with ingress, egress and charging openings, the epurator being formed with openings for the passage of metal and gases and for charging, and a passage 7 connecting the fire chamber with the epurator and passages connecting the epurator and purifier, substantially as shown and described.

2. The combination of a furnace, a purifier having ingress, egress and charging openings, a conduit connecting the furnace with the purifier, and an epurator located in the conduit near the purifier, and consisting of a dome in the top of the furnace, and partitions extending across the conduit, and with openings above and below them; substantially as and for the purpose set forth.

3. The combination of a double furnace located at one end of a conduit, a double furnace located on each side of the conduit, and communicating therewith, a purifier having ingress, egress and charging openings communicating with said conduit, and an epurator having openings for the passage of metal and gases and for charging located in the conduit between the furnaces and the purifier; substantially as and for the purpose set forth.

4. The combination of a purifier having openings 25 and 26, a conduit communicating with the purifier through an opening 20, and having a chimney flue 19 near the purifier, an epurator 12 located in the conduit and having openings for charging it with fuel and for the passage of metal and gases, and furnaces communicating with said conduit; substantially as and for the purpose set forth.

LOUIS ROBERT BONEHILL.

In presence of—
A. M. EBERSOLE,
CLARA G. EDUARDS.